US006839779B2

(12) United States Patent
Simpson et al.

(10) Patent No.: US 6,839,779 B2
(45) Date of Patent: Jan. 4, 2005

(54) COUNTING A NUMBER OF OCCURRENCES OF A FIRST RTS (READY TO SEND) AND A FIRST RTR (READY TO RECEIVE) SIGNALS FOR LIMITING A DATA TRANSFER BANDWIDTH THROUGH HANDSHAKE SUPPRESSION

(75) Inventors: David Leon Simpson, Fishers, IN (US); Didier Joseph Marie Velez, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/490,009

(22) PCT Filed: Sep. 19, 2002

(86) PCT No.: PCT/US02/29755

§ 371 (c)(1),
(2), (4) Date: Mar. 18, 2004

(87) PCT Pub. No.: WO03/034194

PCT Pub. Date: Apr. 24, 2003

(65) Prior Publication Data

US 2004/0236882 A1 Nov. 25, 2004

Related U.S. Application Data

(60) Provisional application No. 60/323,272, filed on Sep. 19, 2001.

(51) Int. Cl.[7] .......................... G06F 13/38; G06F 13/10
(52) U.S. Cl. .............................. 710/60; 710/33; 710/34; 710/58; 710/104
(58) Field of Search ................................ 710/8, 10, 29, 710/33, 34, 58–60, 62, 104–107; 709/232–235, 237; 712/225

(56) References Cited

U.S. PATENT DOCUMENTS

| | | | | |
|---|---|---|---|---|
| 5,019,964 A | | 5/1991 | Yamamoto et al. ......... 364/200 |
| 5,485,147 A | | 1/1996 | Jafe et al. ................ 340/825.5 |
| 5,790,546 A | | 8/1998 | Dobbins et al. ............ 370/400 |
| 5,862,352 A | * | 1/1999 | Muresan ..................... 710/105 |
| 5,881,248 A | | 3/1999 | Mergard ..................... 395/280 |
| 6,105,083 A | | 8/2000 | Kurtze et al. ................ 710/29 |
| 6,141,691 A | | 10/2000 | Frink et al. ................ 709/233 |
| 6,226,702 B1 | * | 5/2001 | Yakashiro ................... 710/107 |
| 6,321,260 B1 | | 11/2001 | Takeuchi et al. ........... 709/223 |
| 6,347,345 B1 | | 2/2002 | Cheon ......................... 710/20 |
| 6,363,444 B1 | | 3/2002 | Platko et al. ............... 710/110 |
| 6,415,347 B1 | * | 7/2002 | Young ........................ 710/305 |
| 6,438,633 B1 | | 8/2002 | Stone ......................... 710/107 |

OTHER PUBLICATIONS

Copy of search report dated Nov. 20, 2002.

* cited by examiner

*Primary Examiner*—Ilwoo Park
(74) *Attorney, Agent, or Firm*—Joseph S. Tripoli; Vincent E. Duffy (57) ABSTRACT

An apparatus for limiting a data transfer bandwidth through handshake suppression is configured to generate a first reset signal, generate a second reset signal a predetermined number of clock cycles after generating the first reset signal, generate a handshake count representing a number of receptions, between the first reset signal and the second reset signal, of a first Ready to Send ("RTS") handshake signal and a first Ready to Receive ("RTR") handshake signal, and disable a second RTR handshake signal and the first RTS handshake signal based on a comparison of the handshake count and a maximum value.

11 Claims, 8 Drawing Sheets

| CLOCK CYCLE NO. | PROG COUNT | $S_1$ | $S_2$ | $S_3$ | $S_4$ | $S_5$ | $Q_1$ | $Q_2$ | RST | $Q_3$ | $Q_4$ |
|---|---|---|---|---|---|---|---|---|---|---|---|
| 0 | 8 | 0 | 0 | 0 | 0 | 0 | 0 | 0 | 0 | 1 | 1 |
| 1 | 8 | 0 | 0 | 0 | 0 | 0 | 0 | 1 | 0 | 1 | 1 |
| 2 | 8 | 0 | 0 | 0 | 0 | 0 | 0 | 2 | 0 | 1 | 1 |
| 3 | 8 | 0 | 0 | 0 | 0 | 0 | 0 | 3 | 0 | 1 | 1 |
| 4 | 8 | 1 | 1 | 0 | 0 | 0 | 0 | 4 | 0 | 1 | 1 |
| 5 | 8 | 1 | 1 | 1 | 1 | 1 | 1 | 5 | 0 | 1 | 1 |
| 6 | 8 | 0 | 0 | 1 | 1 | 0 | 1 | 6 | 0 | 1 | 1 |
| 7 | 8 | 1 | 1 | 1 | 1 | 1 | 2 | 7 | 0 | 1 | 1 |
| 8 | 8 | 1 | 1 | 1 | 1 | 1 | 3 | 8 | 0 | 1 | 1 |
| 9 | 8 | 1 | 1 | 1 | 1 | 1 | 4 | 9 | 0 | 1 | 1 |
| 10 | 8 | 1 | 1 | 1 | 1 | 1 | 5 | A | 0 | 1 | 1 |
| 11 | 8 | 1 | 1 | 1 | 1 | 1 | 6 | B | 0 | 1 | 1 |
| 12 | 8 | 1 | 1 | 1 | 1 | 1 | 7 | C | 0 | 1 | 1 |
| 13 | 8 | 1 | 1 | 1 | 1 | 1 | 8 | D | 0 | 0 | 1 |
| 14 | 8 | 1 | 0 | 1 | 0 | 0 | 8 | E | 0 | 0 | 0 |
| 15 | 8 | 1 | 0 | 1 | 0 | 0 | 0 | F | 1 | 1 | 0 |
| 16 | 8 | 1 | 1 | 1 | 1 | 1 | 1 | 0 | 0 | 1 | 1 |

FIG. 5

| CLOCK CYCLE NO. | PROG COUNT | S₁ | S₂ | S₃ | S₄ | S₅ | Q₁ | Q₂ | RST | Q₃ | Q₄ |
|---|---|---|---|---|---|---|---|---|---|---|---|
| 17 | 3 | 1 | 1 | 1 | 1 | 1 | 2 | 1 | 0 | 1 | 1 |
| 18 | 3 | 0 | 0 | 1 | 1 | 0 | 2 | 2 | 0 | 1 | 1 |
| 19 | 3 | 0 | 0 | 0 | 0 | 0 | 2 | 3 | 0 | 1 | 1 |
| 20 | 3 | 0 | 0 | 0 | 0 | 0 | 2 | 4 | 0 | 1 | 1 |
| 21 | 3 | 0 | 0 | 0 | 0 | 0 | 2 | 5 | 0 | 1 | 1 |
| 22 | 3 | 1 | 1 | 0 | 0 | 0 | 2 | 6 | 0 | 1 | 1 |
| 23 | 3 | 0 | 0 | 0 | 0 | 0 | 2 | 7 | 0 | 1 | 1 |
| 24 | 3 | 0 | 0 | 0 | 0 | 0 | 2 | 8 | 0 | 1 | 1 |
| 25 | 3 | 1 | 1 | 0 | 0 | 0 | 2 | 9 | 0 | 1 | 1 |
| 26 | A | 1 | 1 | 0 | 0 | 0 | 2 | A | 0 | 1 | 1 |
| 27 | A | 1 | 1 | 1 | 1 | 1 | 3 | B | 0 | 1 | 1 |
| 28 | A | 0 | 0 | 1 | 1 | 0 | 3 | C | 0 | 1 | 1 |
| 29 | A | 0 | 0 | 1 | 1 | 0 | 3 | D | 0 | 1 | 1 |
| 30 | A | 0 | 0 | 0 | 0 | 0 | 3 | E | 0 | 1 | 1 |
| 31 | A | 0 | 0 | 0 | 0 | 0 | 0 | F | 1 | 1 | 1 |
| 32 | A | 0 | 0 | 0 | 0 | 0 | 0 | 0 | 0 | 1 | 1 |

FIG. 6

| CLOCK CYCLE NO. | PROG COUNT | $S_1$ | $S_2$ | $S_3$ | $S_4$ | $S_5$ | $Q_1$ | $Q_2$ | RST | $Q_3$ | $Q_4$ |
|---|---|---|---|---|---|---|---|---|---|---|---|
| 33 | 5 | 0 | 0 | 1 | 1 | 0 | 0 | 1 | 0 | 1 | 1 |
| 34 | 5 | 0 | 0 | 1 | 1 | 0 | 0 | 2 | 0 | 1 | 1 |
| 35 | 5 | 1 | 1 | 1 | 1 | 1 | 1 | 3 | 0 | 1 | 1 |
| 36 | 5 | 1 | 1 | 1 | 1 | 1 | 2 | 4 | 0 | 1 | 1 |
| 37 | 5 | 1 | 1 | 0 | 0 | 0 | 2 | 5 | 0 | 1 | 1 |
| 38 | 5 | 1 | 1 | 0 | 0 | 0 | 2 | 6 | 0 | 1 | 1 |
| 39 | 5 | 1 | 1 | 1 | 1 | 1 | 3 | 7 | 0 | 1 | 1 |
| 40 | 5 | 0 | 0 | 0 | 0 | 0 | 3 | 8 | 0 | 1 | 1 |
| 41 | 5 | 1 | 1 | 1 | 1 | 1 | 4 | 9 | 0 | 1 | 1 |
| 42 | 5 | 1 | 1 | 0 | 0 | 0 | 4 | A | 0 | 1 | 1 |
| 43 | 5 | 1 | 1 | 1 | 1 | 1 | 5 | B | 0 | 0 | 1 |
| 44 | 5 | 1 | 0 | 1 | 0 | 0 | 5 | C | 0 | 0 | 0 |
| 45 | 5 | 1 | 0 | 1 | 0 | 0 | 5 | D | 0 | 0 | 0 |
| 46 | 5 | 1 | 0 | 1 | 0 | 0 | 5 | E | 0 | 0 | 0 |
| 47 | 5 | 1 | 0 | 1 | 0 | 0 | 0 | F | 1 | 1 | 0 |
| 48 | 5 | 1 | 1 | 1 | 1 | 1 | 1 | 0 | 0 | 1 | 1 |

FIG. 7

| CLOCK CYCLE NO. | PROG COUNT | $S_1$ | $S_2$ | $S_3$ | $S_4$ | $S_5$ | $Q_1$ | $Q_2$ | RST | $Q_3$ | $Q_4$ |
|---|---|---|---|---|---|---|---|---|---|---|---|
| 49 | E | 0 | 0 | 0 | 0 | 0 | 1 | 1 | 0 | 1 | 1 |
| 50 | E | 0 | 0 | 0 | 0 | 0 | 1 | 2 | 0 | 1 | 1 |
| 51 | E | 0 | 0 | 0 | 0 | 0 | 1 | 3 | 0 | 1 | 1 |
| 52 | 8 | 0 | 0 | 0 | 0 | 0 | 1 | 4 | 0 | 1 | 1 |
| 53 | 8 | 1 | 1 | 0 | 0 | 0 | 1 | 5 | 0 | 1 | 1 |
| 54 | 8 | 1 | 1 | 1 | 1 | 1 | 2 | 6 | 0 | 1 | 1 |
| 55 | 8 | 0 | 0 | 1 | 1 | 0 | 2 | 7 | 0 | 1 | 1 |
| 56 | 9 | 1 | 1 | 1 | 1 | 1 | 3 | 8 | 0 | 1 | 1 |
| 57 | 9 | 1 | 1 | 1 | 1 | 1 | 4 | 9 | 0 | 1 | 1 |
| 58 | 9 | 1 | 1 | 1 | 1 | 1 | 5 | A | 0 | 1 | 1 |
| 59 | 9 | 1 | 1 | 1 | 1 | 1 | 6 | B | 0 | 1 | 1 |
| 60 | 9 | 1 | 1 | 1 | 1 | 1 | 7 | C | 0 | 1 | 1 |
| 61 | 9 | 1 | 1 | 1 | 1 | 1 | 8 | D | 0 | 1 | 1 |
| 62 | 9 | 1 | 1 | 1 | 1 | 1 | 9 | E | 0 | 0 | 1 |
| 63 | 9 | 1 | 0 | 1 | 0 | 0 | 0 | F | 1 | 1 | 0 |
| 64 | 9 | 1 | 1 | 1 | 1 | 1 | 1 | 0 | 0 | 1 | 1 |

FIG. 8

| CLOCK CYCLE NO. | PROG COUNT | S₁ | S₂ | S₃ | S₄ | S₅ | Q₁ | Q₂ | RST | Q₃ | Q₄ |
|---|---|---|---|---|---|---|---|---|---|---|---|
| 65 | 9 | 1 | 1 | 1 | 1 | 1 | 2 | 1 | 0 | 1 | 1 |
| 66 | E | 0 | 0 | 1 | 0 | 0 | 2 | 2 | 0 | 1 | 1 |
| 67 | E | 0 | 0 | 1 | 0 | 0 | 2 | 3 | 0 | 1 | 1 |
| 68 | 8 | 0 | 0 | 0 | 0 | 0 | 2 | 4 | 0 | 1 | 1 |
| 69 | 8 | 1 | 1 | 0 | 0 | 0 | 2 | 5 | 0 | 1 | 1 |
| 70 | 8 | 1 | 1 | 1 | 1 | 1 | 3 | 6 | 0 | 1 | 1 |
| 71 | 8 | 0 | 0 | 1 | 1 | 0 | 3 | 7 | 0 | 1 | 1 |
| 72 | 9 | 1 | 1 | 1 | 1 | 1 | 4 | 8 | 0 | 1 | 1 |
| 73 | 9 | 1 | 1 | 1 | 1 | 1 | 5 | 9 | 0 | 1 | 1 |
| 74 | 2 | 1 | 1 | 1 | 1 | 1 | 6 | A | 0 | 0 | 1 |
| 75 | 1 | 1 | 0 | 1 | 0 | 0 | 6 | B | 0 | 0 | 0 |
| 76 | 2 | 1 | 0 | 1 | 0 | 0 | 6 | C | 0 | 0 | 0 |
| 77 | 7 | 1 | 0 | 1 | 0 | 0 | 6 | D | 0 | 1 | 0 |
| 78 | 7 | 1 | 1 | 1 | 1 | 1 | 7 | E | 0 | 0 | 1 |
| 79 | 7 | 1 | 0 | 1 | 0 | 0 | 0 | F | 1 | 1 | 0 |
| 80 | 7 | 0 | 0 | 1 | 1 | 0 | 0 | 0 | 0 | 1 | 1 |

FIG. 9

COUNTING A NUMBER OF OCCURRENCES OF A FIRST RTS (READY TO SEND) AND A FIRST RTR (READY TO RECEIVE) SIGNALS FOR LIMITING A DATA TRANSFER BANDWIDTH THROUGH HANDSHAKE SUPPRESSION

PRIORITY CLAIM

This application claims the benefit, under 35 U.S.C. § 365 of International Application PCT/US02/29755, filed Sep. 19, 2002, which was published in accordance with PCT Article 21(2) on Apr. 24, 2003 in English and which claims the benefit of U.S. Provisional Patent Application No. 60/323,272, file Sep. 19, 2001, which is incorporated herein by reference.

FIELD OF THE INVENTION

The present invention relates to data transfers in a video processing system.

BACKGROUND OF THE INVENTION

In a video processing system with an unified memory architecture, many processes typically share memory resources in order to minimize system cost. Each process has a route or pipeline by which it receives input data from the memory and/or by which it moves or transfers intermediate data through the memory as operations progress between subroutines or blocks designed to complete various tasks. Handshake signals typically manage the flow of data between the blocks.

Figure 1:
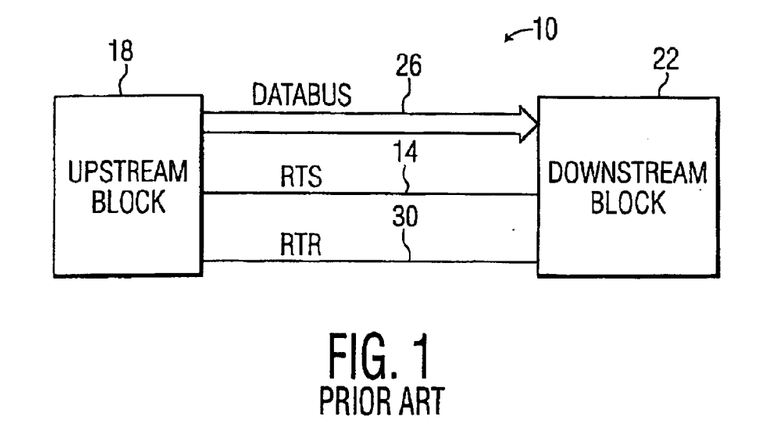
FIG. 1 (Prior Art) is a block diagram of an exemplary conventional synchronous Ready To Send and Ready To Receive ("RTS/RTR") handshake scheme.

FIG. 1 (Prior Art) is a block diagram of an exemplary conventional synchronous Ready To Send and Ready To Receive ("RTS/RTR") handshake scheme 10. In the conventional scheme 10, a first handshake channel 14 couples an upstream block 18 to a downstream block 22. First handshake channel 14 is configured to carry a Ready To Send ("RTS") handshake signal, which is active to indicate that upstream block 18 is prepared to send at least one word of data over a data bus 26 to downstream block 22. Meanwhile, a second handshake channel 30 further couples upstream block 18 to downstream block 22. Second handshake channel 30 is configured to carry a Ready To Receive ("RTR") handshake signal, which is active to indicate that downstream block 22 is prepared to accept at least one word of data from upstream block 18 via data bus 26. When a controller (not shown) detects both handshake signals during a clock cycle, a handshake is considered to have occurred. During each clock cycle for which a handshake has occurred, the controller causes one word of data to be transferred from upstream block 18 to downstream block 22 via data bus 26.

Distributing the limited bandwidth of the memory resources amongst the various processes in a unified memory architecture can be a problem. In general, the total system bandwidth (dictated primarily by the type of memory devices) must be greater than or equal to the sum of the bandwidths of all the processes. However, the peak bandwidth of any process (where data is transferred in bursts) must not "starve" any lower priority process (i.e., cause a larger latency between data bursts than the lower priority process can tolerate). In some systems that employ RTS/RTR handshaking, some processes can have high peak bandwidths which fill up the data pipeline and starve other processes.

The present invention is directed to overcoming this problem.

SUMMARY OF THE INVENTION

An apparatus for limiting a data transfer bandwidth through handshake suppression includes a first arrangement configured to receive a plurality of dock cycles, further configured to generate a first reset signal, and further configured to generate a second reset signal a predetermined number of dock cycles after generating the first reset signal. The apparatus also includes a second arrangement coupled to the first arrangement to receive the reset signals therefrom. The second arrangement is configured to receive the reset signals, further configured to receive a first Ready to Send ("RTS") handshake signal and a first Ready to Receive ("RTR") handshake signal, and further configured to generate a handshake count representing a number of simultaneous receptions, between a reception of the first reset signal and a reception of the second reset signal, of the first RTS handshake signal and the first RTR handshake signal. The apparatus further includes a third arrangement coupled to the second arrangement to receive the handshake count therefrom. The third arrangement is configured to generate a disable signal based on a comparison of the handshake count and a maximum value. The apparatus also includes a fourth arrangement coupled to the third arrangement to receive the disable signal therefrom, the fourth arrangement is configured to disable a second RTR handshake signal and the first RTS handshake signal in response to the disable signal.

A process for limiting a data transfer bandwidth through handshake suppression includes counting a first number of dock cycles, counting a first number of simultaneous occurrences of a first RTS handshake signal and a first RTR handshake signal, and suppressing a second RTS handshake signal and a second RTR handshake signal based on the first number of clock cycles and the first number of simultaneous occurrences of the first RTS handshake signal and the first RTR handshake signal.

An apparatus for limiting a data transfer bandwidth through handshake suppression includes a first means for counting a number of dock cycles, a second means for counting a number of simultaneous occurrences of a first RTS handshake signal and a first RTR handshake signal, a third means, coupled to the first means and the second means, for resetting the counting of the second means when the number of clock cycles counted by the first means reaches a first value, and a fourth means, coupled to the second means, for suppressing a second RTR handshake signal and the first RTS handshake signal when the number of simultaneous occurrences of the first RTS handshake signal and the first RTR handshake signal counted by the second means reaches a second value.

DETAILED DESCRIPTION OF THE PREFERRED EMBODIMENT

The characteristics and advantages of the present invention will become more apparent from the following description, given by way of example.

Figure 2:
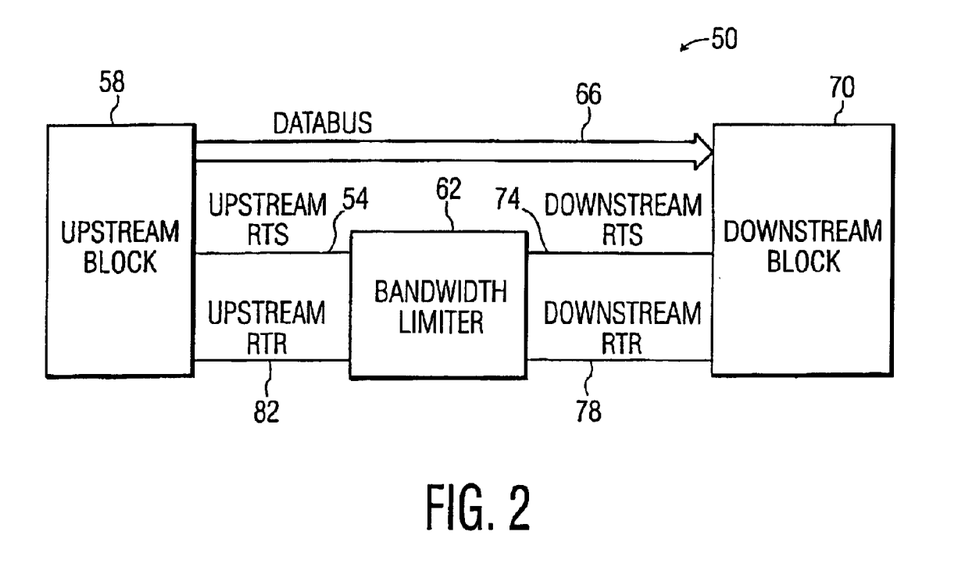
FIG. 2 is a block diagram of an exemplary bandwidth limited RTS/RTR handshake scheme according to the present invention.

FIG. 2 is a block diagram of an exemplary bandwidth limited RTS/RTR handshake scheme 50 according to the present invention. In handshake scheme 50, a first handshake channel 54 couples an upstream block 58 to a programmable bandwidth limiter using handshake suppression ("PBLUS") 62. First handshake channel 54 is configured to carry an UPSTREAM READY TO SEND ("RTS") handshake signal. The UPSTREAM RTS handshake signal is active to indicate that upstream block 58 is prepared to send at least one word of data over a data bus 66 to a downstream block 70. A second handshake channel 74 couples PBLUS 62 to downstream block 70. Second handshake channel 74 is configured to carry a DOWNSTREAM RTS signal. PBLUS 62 uses the DOWNSTREAM RTS signal to limit the bandwidth of data transfers from upstream block 58 to downstream block 70 as discussed in further detail below. Meanwhile, a third handshake channel 78 further couples downstream block 70 to PBLUS 62. Third handshake channel 78 is configured to carry a DOWNSTREAM Ready To Receive ("RTR") handshake signal. The DOWNSTREAM RTR handshake signal is active to indicate that downstream block 70 is prepared to accept at least one word of data from upstream block 58 over data bus 66. Additionally, a fourth handshake channel 82 further couples PBLUS 62 to upstream block 58. Fourth handshake channel 82 is configured to carry an UPSTREAM RTR signal. PBLUS 62 uses the UPSTREAM RTR signal to limit the bandwidth of data transfers from upstream block 58 to downstream block 70 as discussed in further detail below.

Figure 3:
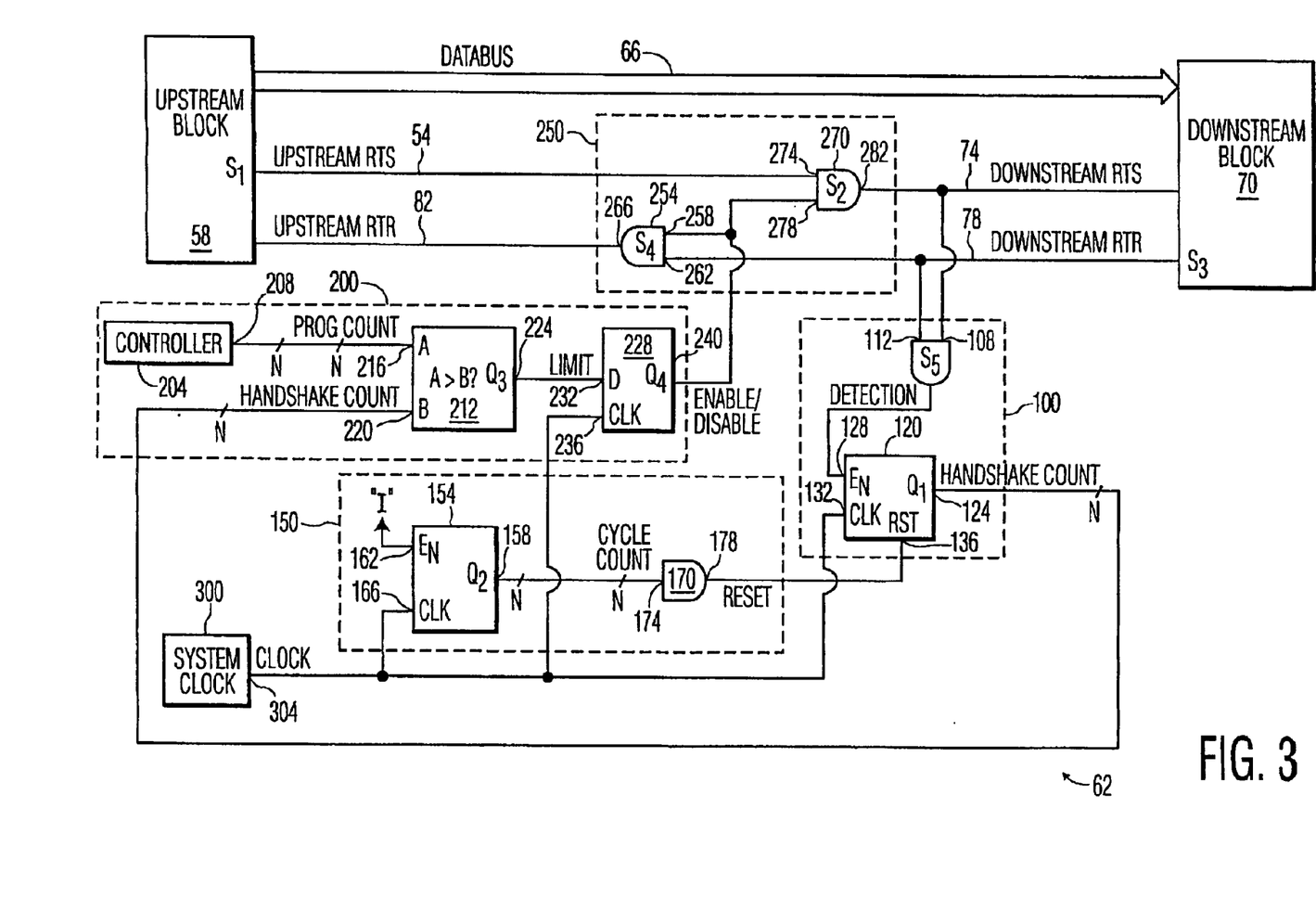
FIG. 3 is a block diagram of the exemplary programmable bandwidth limiter using handshake suppression ("PBLUS") of FIG. 2.

FIG. 3 is a block diagram of the exemplary programmable bandwidth limiter using handshake suppression ("PBLUS") 62 of FIG. 2. In the exemplary embodiment, PBLUS 62 is implemented by synchronous digital logic circuitry as discussed herein. However, it is noted that in alternative embodiments PBLUS 62 may be implemented by any other suitable hardware, software, or combination thereof. For clarity of exposition, first handshake channel 54, upstream block 58, data bus 66, downstream block 70, second handshake channel 74, third handshake channel 78, and fourth handshake channel 82 (see FIG. 2) are shown again in FIG. 3.

PBLUS 62 includes an electronic arrangement 100. Arrangement 100 includes an AND gate 104. AND gate 104 has an input 108 coupled to second handshake channel 74 and an input 112 coupled to third handshake channel 78. AND gate 104 also has an output 116. Arrangement 100 further includes an N-bit binary counter (i.e., mod-$2^N$ counter) 120 which is configured to provide a number, N, of count bits at a number, N, of outputs 124. The number, N, is discussed further below. Counter 120 further includes an enable input 128 coupled to output 116 of AND gate 104. Counter 120 also includes a clock input 132 and a reset input 136.

PBLUS 62 further includes an electronic arrangement 150. Arrangement 150 includes an N-bit binary counter 154 which is configured to provide a number, N, of count bits at a number, N, of outputs 158. Counter 154 also includes an enable input 162 which is coupled to a logical 1 (i.e., always enabled during operation), and counter 154 further includes a dock input 166. Arrangement 150 further includes an AND gate 170 with a number, N, of inputs 174, each of which being coupled to a respective one of outputs 158 of counter 154. AND gate 170 also includes an output 178 which is coupled to reset input 136 of counter 120.

PBLUS 62 further includes an electronic arrangement 200. Arrangement 200 includes a controller 204 with a number, N, of outputs 208. Controller 204 is configured to change or adjust outputs 208 to provide a binary number thereon indicating a maximum value ("PROG COUNT"), which discussed further below. Arrangement 200 further includes a digital comparator 212 with a first set of N inputs 216, a second set of N inputs 220, and an output 224. First set of inputs 216 is coupled to outputs 208 of controller 204, and second set of inputs 220 is coupled to outputs 124 of counter 120. Comparator 212 is configured to provide a logical 1 at output 224 when a first binary number received at first set of N inputs 216 is greater than a second binary number received at second set of N inputs 220, and to provide a logical 0 at output 224 otherwise. Arrangement 200 also includes a D Flip-Flop 228 with a D input 232 coupled to output 224 of comparator 212. D Flip-Flop 228 further includes a clock input 236 and a Q output 240.

PBLUS 62 further includes an electronic arrangement 250. Arrangement 250 includes an AND gate 254. AND gate 254 has an input 258 coupled to Q output 240 of D Flip-Flop 228, an input 262 coupled to third handshake channel 78 (and thus, also coupled to input 112 of AND gate 104), and an output 266 coupled to fourth handshake channel 82. Arrangement 250 further includes an AND gate 270. AND gate 270 has an input 274 coupled to first handshake channel 54, an input 278 coupled to input 258 of AND gate 254 (and thus, also coupled to Q output 240 of D Flip-Flop 228), and an output 282 coupled to second handshake channel 74.

A system clock 300 provides a clock signal ("CLOCK") at an output 304. Output 304 is coupled to clock input 132, clock input 166, and dock input 236. In the exemplary embodiment, counter 120, counter 154, AND gate 170, and comparator 212 are each implemented with the previously noted number of bits and/or input and/or output lines, N, each equal to 4. N defines a bandwidth limiting interval and a desired resolution as discussed further below. In alternative embodiments, PBLUS 62 may be configured with any other suitable N to achieve a different bandwidth limiting interval and more or less resolution.

Figure 4:
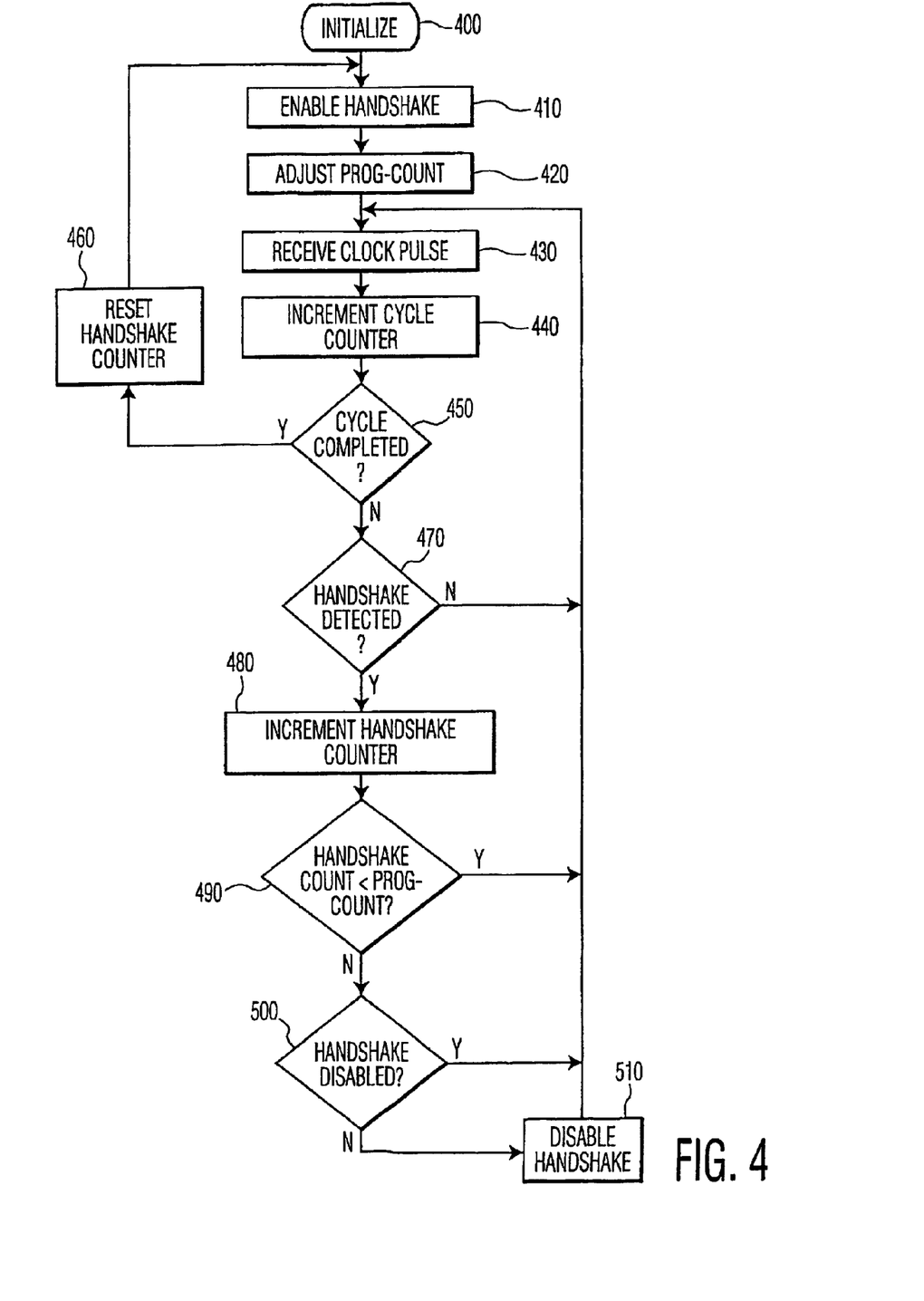
FIG. 4 is a flow diagram of exemplary operations of the PBLUS of FIG. 3.
Figure 5:
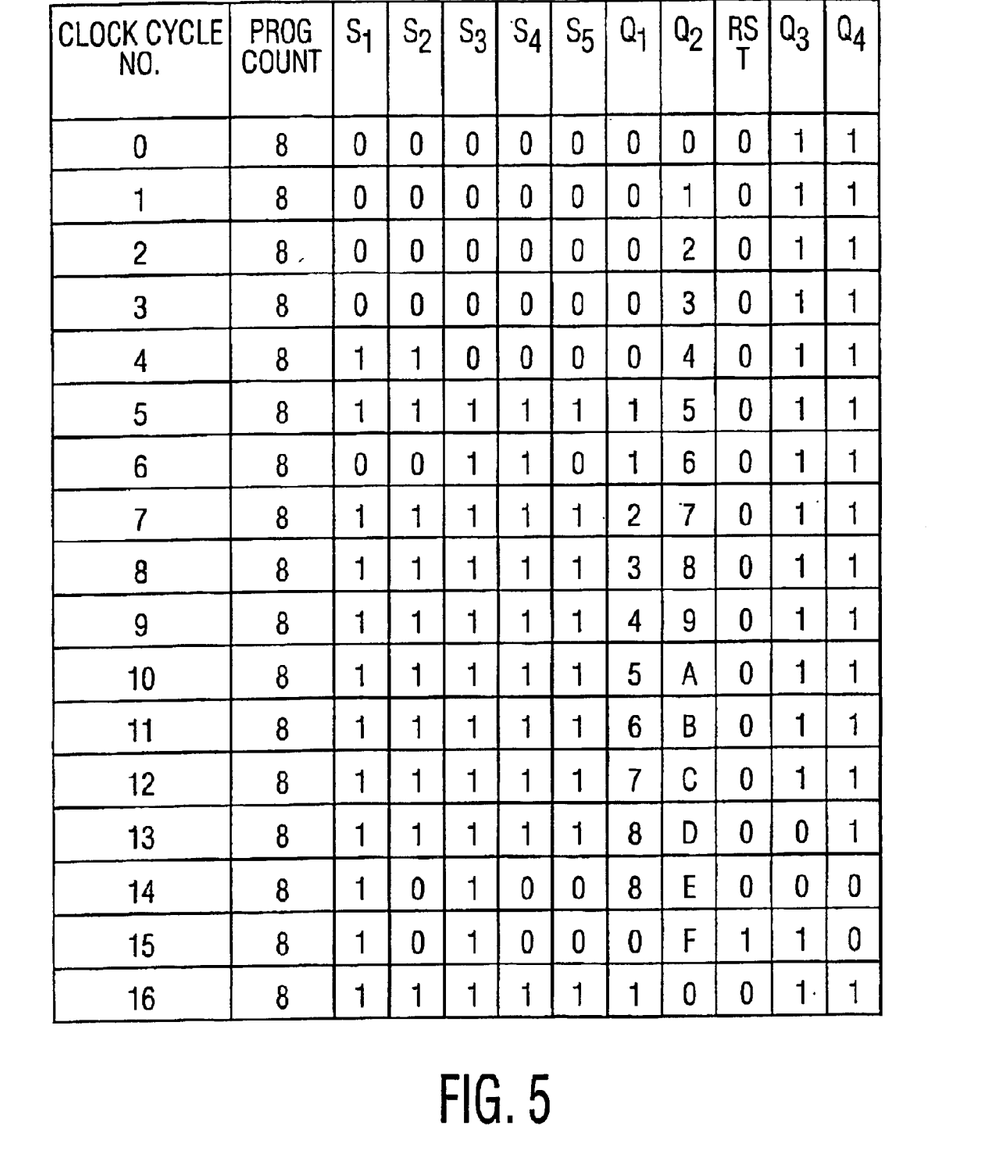
FIGS. 5–9 list signal states for a first hypothetical bandwidth limiting cycle, a second hypothetical bandwidth limiting cycle, a third hypothetical bandwidth limiting cycle, a fourth hypothetical bandwidth limiting cycle, and a fifth hypothetical bandwidth limiting cycle, respectively, for the PBLUS of FIG. 3.
Figure 6:
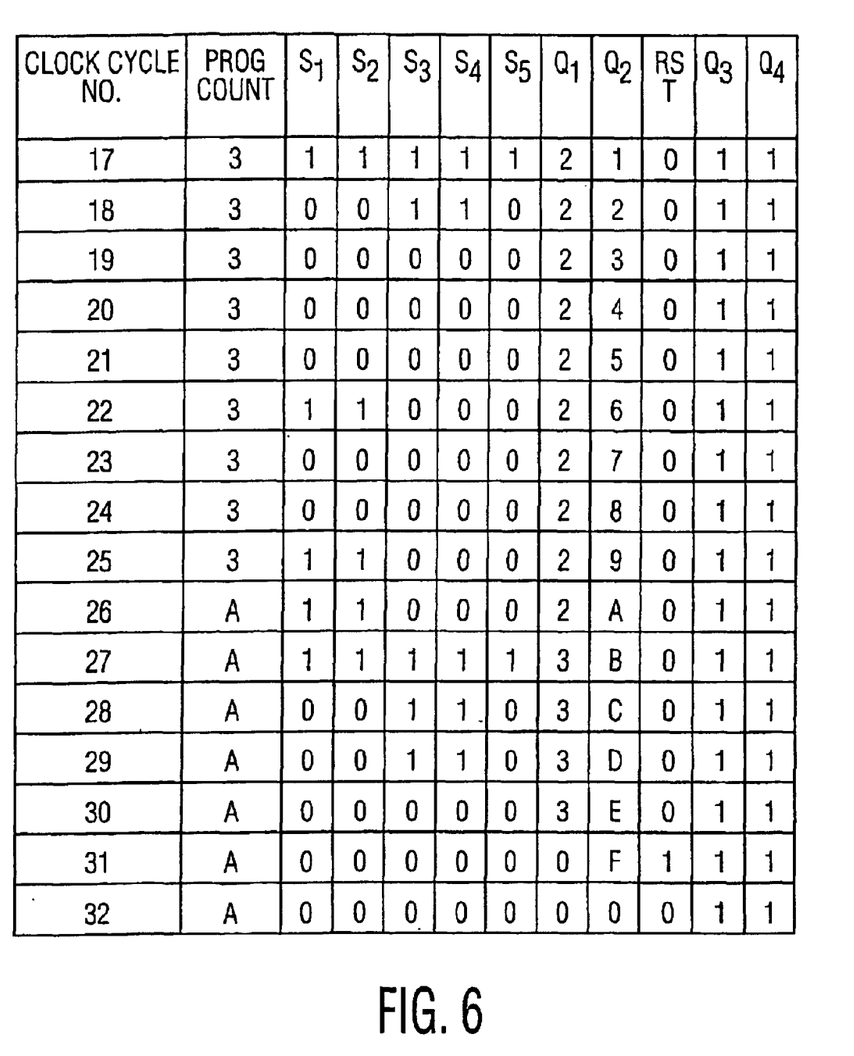
Figure 7:
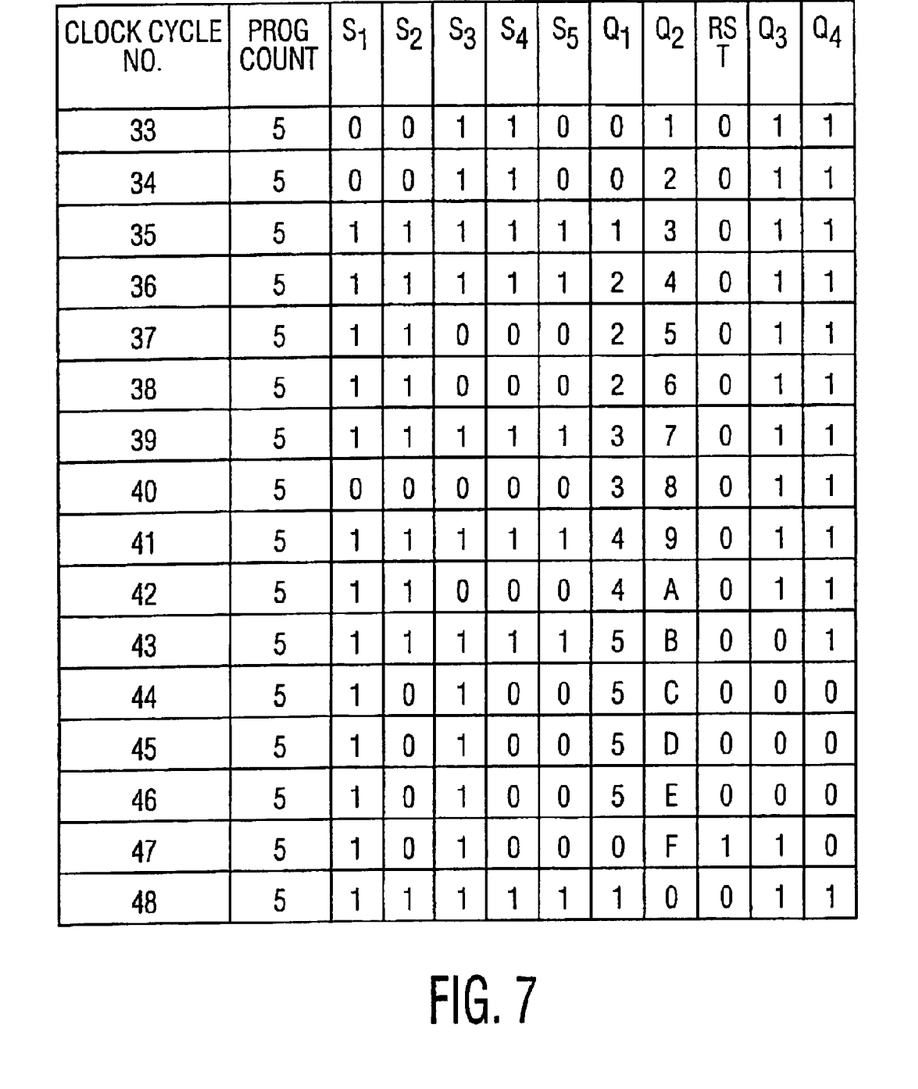
Figure 8:
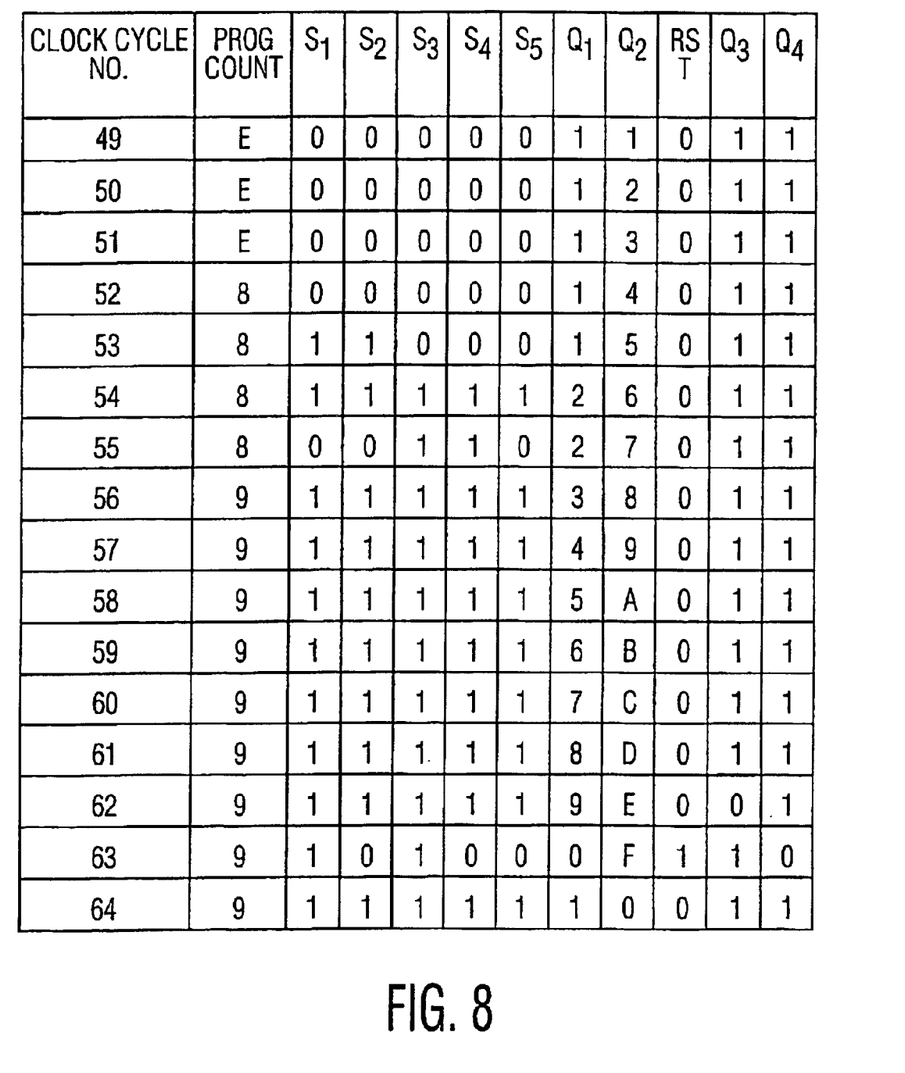
Figure 9:
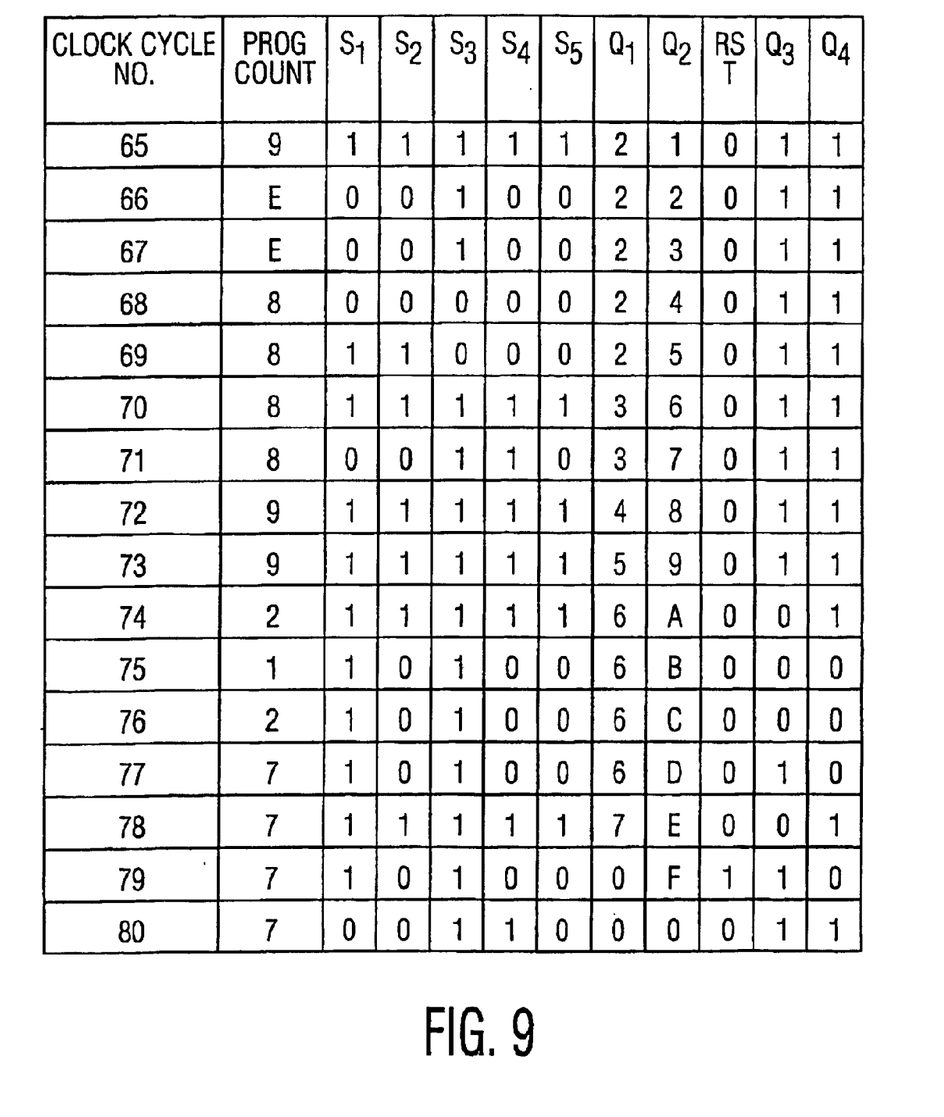

FIG. 4 is a flow diagram of exemplary operations of the PBLUS 62 of FIG. 3. It should be appreciated that as the CLOCK signal from system clock 300 drives the various components of PBLUS 62 in synchronism, PBLUS 62 executes one iteration of the various operations discussed below for each cycle or pulse of the CLOCK and, thus, the flow diagram of FIG. 4 is merely exemplary of the nature of the operations from CLOCK cycle to CLOCK cycle and not meant to imply a particular sequence or order of operations during each CLOCK cycle.

At step 400, PBLUS 62 (see FIG. 3) executes appropriate initialization operations. In the exemplary embodiment, PBLUS 62 executes these operations upon power up. However, it should be appreciated that in alternative embodiments PBLUS 62 may execute step 400 operations in response to a reset signal from an external device. Step 400 operations include forcing outputs 124 (i.e., HANDSHAKE COUNT) and outputs 158 (i.e., CYCLE COUNT) to logical 0 in well known manners, forcing output 240 (i.e., ENABLE/DISABLE) to logical 1 in a well known manner, and controller 208 sending an initial PROG COUNT (greater than zero) to inputs 216 of comparator 212. After step 400 operations, PBLUS 62 automatically proceeds to step 410.

At step 410, D Flip-Flop 228 sends the logical 1 at its output 240 to input 258 of AND gate 254 and input 278 of AND gate 270. It should be appreciated, then, that step 410 operations allow the state of UPSTREAM RTS to be passed from upstream block 58 through AND gate 270 to DOWNSTREAM RTS (and, thus, to downstream block 70); and allow the state of DOWNSTREAM RTR to be passed from downstream block 70 through AND gate 254 to UPSTREAM RTR (and, thus, to upstream block 58). In other words, step 410 operations enable the RTS/RTR handshaking capability between upstream block 58 and downstream block 70. After step 410 operations, PBLUS 62 automatically proceeds to step 420.

At step 420, controller 204 changes or adjusts PROG COUNT. PROG COUNT represents a maximum number of RTS/RTR handshakes to be allowed between upstream block 58 and downstream block 70 by PBLUS 62 during a bandwidth limiting interval. As used herein, the term "bandwidth limiting interval" means an interval defined by $2^N$ cycles of the CLOCK signal provided by system clock 300, where N is the number of bits or output lines 158 of counter 154 (which is equal to the number of bits or output lines 124 of counter 120, and which is equal to the number of bits or output lines 208 of controller 204 and, thus, is also equal to the number of bits of the PROG COUNT signal). Thus, the exemplary embodiment (wherein N=4) provides a bandwidth limiting interval of 16 CLOCK cycles. It should be appreciated that limiting the number of RTS/RTR handshakes between upstream block 58 and downstream block 70 within the bandwidth limiting interval effectively limits the data transfer bandwidth between the blocks. Controller 204 monitors competing processes and adjusts PROG COUNT to optimize the data transfer bandwidth for high throughput with minimized starvation of lower priority processes, thus reducing instances when data bus 66 is over-constrained or under-constrained during various modes of operation. Via PROG COUNT, controller 204 indicates a desired bandwidth to suit the needs of each mode. It should be appreciated that the exemplary embodiment provides a 1/N resolution of the PROG COUNT (which amounts to a 6.25% resolution when N equals 4). After step 420 operations, PBLUS 62 automatically proceeds to step 430.

At step 430, counter 120, counter 154, and D Flip-Flop 228 receive a synchronous CLOCK signal pulse from system clock 300. After step 430 operations, PBLUS 62 automatically proceeds to step 440.

At step 440, counter 154 increments the CYCLE COUNT at outputs 158 in response to the CLOCK pulse. It is noted that counter 154 "rolls over" upon incrementing from its full value. That is, when each of outputs 158 is logical 1 immediately before counter 154 receives the CLOCK pulse, counter 154 causes each of outputs 158 to change to a logical 0 upon receiving the CLOCK pulse. After step 440 operations, PBLUS 62 automatically proceeds to step 450.

At step 450, AND gate 170 determines whether the present bandwidth limiting interval has come to an end by determining whether counter 154 has reached its full value (i.e., by determining whether each of inputs 174 has received a logical 1). If so, then AND gate 170 provides a logical 1 at output 178 and PBLUS 62 automatically proceeds to step 460; otherwise, AND gate 170 maintains a logical 0 at output 178 and PBLUS 62 automatically proceeds to step 470.

At step 460, counter 120 receives the logical 1 from AND gate 170 at input 136 (see step 450, discussed above) and counter 120 resets in response thereto. It should be appreciated that this effectively resets HANDSHAKE COUNT upon completion of each bandwidth limiting interval and, thus, forces counter 120 to count handshakes anew for each bandwidth limiting interval (see also steps 470 and 480, discussed below). After step 460 operations, PBLUS 62 automatically loops back to step 410.

At step 470, AND gate 104 detects whether upstream block 58 and downstream block 70 have made an RTS/RTR handshake by determining whether a logical 1 is present at each of input 108 and input 112. If so, then AND gate 104 provides a logical 1 at output 116 and PBLUS 62 automatically proceeds to step 480; otherwise, PBLUS 62 loops back to step 430.

At step 480, counter 120 receives the logical 1 from AND gate 104 at input 128. Again, the logical 1 from AND gate 104 indicates that a RTS/RTR handshake has occurred (i.e., that a RTS signal and a corresponding RTR signal has been sent between upstream block 58 and downstream block 70). This enables counter 120 and, thus, counter 120 increments the HANDSHAKE COUNT at outputs 124 in response to the CLOCK pulse. It is noted that counter 120 "rolls over" upon incrementing from its full value. That is, when each of outputs 124 is logical 1 immediately before counter 154 receives the CLOCK pulse, counter 154 causes each of outputs 158 to change to a logical 0 upon receiving the CLOCK pulse. After step 480 operations, PBLUS 62 automatically proceeds to step 490.

At step 490, comparator 212 determines whether the PROG COUNT at inputs 216 is greater than the HANDSHAKE COUNT at inputs 220 and provides a LIMIT signal at output 224 accordingly. It should be appreciated that when the PROG COUNT is no longer greater than the HANDSHAKE COUNT, then the maximum number of allowed RTS/RTR handshakes during the present bandwidth limiting interval has been reached. If the PROG COUNT is greater than the HANDSHAKE COUNT, then comparator 212 maintains the LIMIT signal at a logical 1 and PBLUS 62 loops back to step 430; otherwise, comparator 212 makes the LIMIT signal a logical 0 and PBLUS 62 proceeds to step 500.

At step 500, D Rip-Flop 228 receives the logical 0 from comparator 212 (see step 490, discussed above) at input 232 and provides the ENABLE/DISABLE signal at output 240 accordingly. If the ENABLE/DISABLE signal is already a logical 0, then the RTS/RTR handshaking between upstream block 58 and downstream block 70 is already disabled because AND gate 254 and AND gate 270 each already receive the logical 0 at input 258 and input 278, respectively (which thus forces the DOWNSTREAM RTS and the UPSTREAM RTR each to a logical 0 regardless of the states of UPSTREAM RTS and DOWNSTREAM RTR), and PBLUS 62 loops back to step 430; otherwise, PBLUS 62 proceeds to step 510, where the output 240 of D Flip-Flop 228 changes the ENABLE/DISABLE from a logical to a logical 0, which disables the RTS/RTR handshaking between upstream block 58 and downstream block 70 by causing AND gate 254 and AND gate 270 to force the DOWNSTREAM RTS and the UPSTREAM RTR each to a logical 0 regardless of the states of UPSTREAM RTS and DOWNSTREAM RTR. After step 510 operations, PBLUS 62 loops back to step 430.

Thus, it should be appreciated that in operation PBLUS 62 limits the data transfer rate (and thus, the bandwidth) between upstream block 58 and downstream block 70 by automatically disabling and enabling the DOWNSTREAM RTS handshake signal and the UPSTREAM RTR signal, which inhibits the data flow between the blocks. To determine when to disable the handshaking signals, PBLUS 62 counts the number of completed RTS/RTS handshakes during a present interval and compares it to an adjustable maximum. When the maximum is reached, the DOWNSTREAM RTS and the UPSTREAM RTR are disabled for the remainder of the present interval and then re-enabled at the beginning of a new interval.

FIGS. 5–9 list signal states for a first hypothetical bandwidth limiting cycle, a second hypothetical bandwidth limiting cycle, a third hypothetical bandwidth limiting cycle, a fourth hypothetical bandwidth limiting cycle, and a fifth hypothetical bandwidth limiting cycle, respectively, for the PBLUS 62 of FIG. 3. Consecutive cycles of the CLOCK are numbered (in base 10) in the first column of each table. CLOCK cycle No. 0 corresponds to power up initialization; CLOCK cycle Nos. 1–16 correspond to the first hypothetical bandwidth limiting cycle; CLOCK cycle Nos. 17–32 correspond to the second hypothetical bandwidth limiting cycle; CLOCK cycle Nos. 33–48 correspond to the third hypothetical bandwidth limiting cycle; CLOCK cycle Nos. 49–64 correspond to the fourth hypothetical bandwidth limiting cycle; and CLOCK cycle Nos. 6580 correspond to the fifth hypothetical bandwidth limiting cycle. The columns "PROG COUNT," "$S_1$," "$S_2$," "$S_3$," "$S_4$," "$S_5$," "$Q_1$," "$Q_2$," "RST," "$Q_3$," and "$Q_4$," list exemplary states for PROG COUNT (in hexadecimal), UPSTREAM RTS (in binary), DOWNSTREAM RTS (in binary), DOWNSTREAM RTR (in binary), UPSTREAM RTR (in binary), output 116 (in binary), outputs 124 (in hexadecimal), outputs 158 (in hexadecimal), input 136 (in binary), output 224 (on binary), and output 240 (in binary), respectively (see FIG. 3, discussed above), for each of the CLOCK cycles. Controller 204 adjusts PROG COUNT from time to time as discussed above. When $Q_4$ is 1, the RTS/RTR handshaking between upstream block 58 and downstream block 70 is enabled; and when $Q_4$ is 0, the RTS/RTR handshaking between upstream block 58 and downstream block 70 is disabled. It should be appreciated that the states shown for $S_1$ (UPSTREAM RTS) and $S_3$ (DOWNSTREAM RTR) are merely hypothetical states set by upstream block 58 and downstream block 70, respectively (and not controlled by PBLUS 62). Further, it should be appreciated that the hypothetical bandwidth limiting cycles of FIGS. 5–9 are merely exemplary, and PBLUS 62 is capable of many additional operational scenarios.

While the present invention has been described with reference to the preferred embodiment, it is apparent that various changes may be made in the embodiment without departing from the spirit and the scope of the invention, as defined by the appended claims.

What is claimed is:

1. An apparatus for limiting a data transfer bandwidth through handshake suppression, the apparatus comprising:
    a first arrangement being configured to receive a plurality of clock cycles, being further configured to generate a first reset signal, and being further configured to generate a second reset signal a predetermined number of clock cycles after generating the first reset signal;
    a second arrangement coupled to the first arrangement to receive the reset signals therefrom, the second arrangement being configured to receive the reset signals, being further configured to receive a first Ready To Send ("RTS") handshake signal and a first Ready to Receive ("RTR") handshake signal, and being further configured to generate a handshake count representing a number of receptions, between a reception of the first reset signal and a reception of the second reset signal, of the first RTS handshake signal and the first RTR handshake signal;
    a third arrangement coupled to the second arrangement to receive the handshake count therefrom, the third arrangement being configured to generate a disable signal based on a comparison of the handshake count and a maximum value;
    a fourth arrangement coupled to the third arrangement to receive the disable signal therefrom, the fourth arrangement being configured to disable a second RTR handshake signal and the first RTS handshake signal in response to the disable signal.

2. The apparatus of claim 1, wherein the third arrangement includes a controller being configured to adjust the maximum value.

3. The apparatus of claim 1, wherein the first arrangement includes a first AND gate and a first counter, the second arrangement includes a second counter and a second AND gate, the third arrangement includes a comparator and a D Flip-Flop, and the fourth arrangement includes a third AND gate and a fourth AND gate.

4. The apparatus of claim 3, wherein the second counter includes a binary counter.

5. The apparatus of claim 3, wherein the first arrangement consists essentially of a first AND gate and a first binary counter, the second arrangement consists essentially of a second binary counter and a second AND gate, the third arrangement consists essentially of a controller, a comparator and a D Flip-Flop, and the fourth arrangement consists essentially of a third AND gate and a fourth AND gate.

6. A process for limiting a data transfer bandwidth through handshake suppression, the process comprising the steps of:
    counting a first number of clock cycles;
    counting a first number of occurrences of a first Ready To Send ("RTS") handshake signal and a first Ready To Receive ("RTR") handshake signal; and
    suppressing a second RTS handshake signal and a second RTR handshake signal based on the first number of clock cycles and the first number of occurrences of the first RTS handshake signal and the first RTR handshake signal.

7. The process of claim 6, wherein the step of suppressing the second RTS handshake signal and the second RTR handshake signal based on the first number of clock cycles and the first number of occurrences of the first RTS handshake signal and the first RTR handshake signal includes comparing the first number of occurrences of the first RTS handshake signal and the first RTR handshake signal to a first maximum value.

8. The process of claim 7, further comprising the steps of:
    counting a second number of clock cycles;
    counting a second number of occurrences of the first RTS handshake signal and the first RTR handshake signal; and
    suppressing the second RTS handshake signal and the second RTR handshake signal based on the second number of clock cycles and the second number of occurrences of the first RTS handshake signal and the first RTR handshake signal;

wherein the step of suppressing the second RTS handshake signal and the second RTR handshake signal based on the second number of clock cycles and the second number of occurrences of the first RTS handshake signal and the first RTR handshake signal includes comparing the second number of occurrences of the first RTS handshake signal and the first RTR handshake signal to a second maximum value.

9. An apparatus for limiting a data transfer bandwidth through handshake suppression, the apparatus comprising:

a first means for counting a number of clock cycles;

a second means for counting a number of occurrences of a first Ready To Send ("RTS") handshake signal and a first Ready To Receive ("RTR") handshake signal;

a third means, coupled to the first means and the second means for resetting the counting of the second means when the number of clock cycles counted by the first means reaches a first value; and a fourth means, coupled to the second means, for suppressing a second RTR handshake signal and the first RTS handshake signal when the number of occurrences of the first RTS handshake signal and the first RTR handshake signal counted by the second means reaches a second value.

10. The apparatus of claim 9, wherein the fourth means includes a means for receiving the second value.

11. The apparatus of claim 10, further including a fifth means, coupled to the fourth means, for adjusting the second value.

* * * * *